United States Patent [19]
Kondo et al.

[11] Patent Number: 5,453,800
[45] Date of Patent: Sep. 26, 1995

[54] APPARATUS FOR JUDGING A HAND MOVEMENT OF AN IMAGE

[75] Inventors: Tetsujiro Kondo; Yasuhiro Fujimori, both of Kanagawa; Masashi Uchida, Tokyo; Takashi Horishi; Tsukasa Hashino, both of Kanagawa, all of Japan

[73] Assignee: Sony Corporation, Tokyo, Japan

[21] Appl. No.: 958,791

[22] Filed: Oct. 9, 1992

[30] Foreign Application Priority Data

| Oct. 17, 1991 | [JP] | Japan | 3-296532 |
| Oct. 17, 1991 | [JP] | Japan | 3-296533 |
| Oct. 30, 1991 | [JP] | Japan | 3-310163 |

[51] Int. Cl.⁶ .................................................. H04N 7/32
[52] U.S. Cl. ........................................... 348/699; 348/208
[58] Field of Search .................................. 358/105, 125, 358/136, 133; 348/208, 699, 154–155, 169, 214, 219, 409, 424; H04N 7/137

[56] References Cited

U.S. PATENT DOCUMENTS

| 5,099,323 | 3/1992 | Morimura et al. | 358/105 |
| 5,157,732 | 10/1992 | Ishii et al. | 348/208 |
| 5,184,216 | 2/1993 | Kobayashi | 358/105 |
| 5,193,003 | 3/1993 | Kondo | 348/424 |
| 5,204,741 | 4/1993 | Sakaguchi | 358/105 |
| 5,237,405 | 8/1993 | Egusa et al. | 358/105 |

FOREIGN PATENT DOCUMENTS

| 0393823 | 10/1990 | European Pat. Off. |  |
| 0449283 | 10/1991 | European Pat. Off. | H04N/5/217 |
| 0498730 | 8/1992 | European Pat. Off. | H04N/5/14 |

*Primary Examiner*—Tommy P. Chin
*Assistant Examiner*—Vu Le
*Attorney, Agent, or Firm*—William S. Frommer; Alvin Sinderbrand

[57] ABSTRACT

In an apparatus for judging a hand movement of an image, pixels where absolute values of differences between image data of respective pixels of blocks of a current frame and image data of representative point pixels of blocks of an earlier frame read out from a representative point memory satisfy a predetermined condition are judged by a condition judgment circuit to form a frequency distribution table corresponding to the judged result by a frequency distribution table formation circuit to calculate, on the basis of the frequency distribution table, the number of coordinates having a frequency value greater than a predetermined value in the vicinity of a coordinate designated by a motion vector of an image to judge the motion vector to result from a hand movement when the calculated value is less than a predetermined value.

3 Claims, 11 Drawing Sheets

APPARATUS FOR JUDGING A HAND MOVEMENT OF AN IMAGE

FIELD OF THE INVENTION

This invention relates to an apparatus for judging a hand movement of an image, and more particularly to an apparatus for judging a hand movement of an image, which is suitable when applied to a hand movement processing of image.

DESCRIPTION OF THE PRIOR ART

Generally, in a video camera of the handy type, a hand movement at the time of imaging, i.e., movement of the camera appears as movement of an image (pictorial image). As an apparatus for correcting a hand movement of an image which is adapted for correcting a movement of an image resulting from such hand movement, e.g., as disclosed in the Japanese Patent Application Laid Open No. 166370/1988 publication, there is proposed an apparatus adapted to detect a motion vector of an image to correct video data stored in an image memory on the basis of this motion vector.

As detection of a motion vector of an image, e.g., so called a block matching method is adopted. In the detection of motion vector of an image by this block matching method, a picture is divided into a large number of areas (hereinafter referred to as blocks) to calculate absolute values of frame difference between representative point pixels of an earlier frame positioned at the central portions of respective blocks and image data of respective pixels within blocks of a current frame to integrate frame difference absolute values of respective blocks every corresponding pixels to calculate correlative integrated values to form a correlative integrated value table having coordinates corresponding to pixel arrangement of one block. Then, a motion vector of the entirety of a picture is determined with coordinate values of a minimum value of the correlative integrated values in the correlative integrated value table being as a coordinate value of the motion vector of an image.

In the apparatus for correcting a hand movement of an image, a detected motion vector is converted to a correction signal, thus to carry out correction to move a current or present image by this correction signal. The correction accuracy in such an apparatus for correcting a hand movement of a picture depends upon detection accuracy of a motion vector of an image.

Meanwhile, in the conventional detection of a motion vector of an image by the block matching method in which a motion vector of the entirety of a picture is determined with coordinate values of a minimum value of a correlative integrated value in the correlative integrated value table being as a coordinate value of the motion vector as described above, a motion vector resulting from a hand movement of a camera and a motion vector resulting from a relative movement of an object take place at the same time. Accordingly, it is necessary to discriminate between the motion vector resulting from hand movement and the motion vector resulting from relative movement of the object to form a hand movement correction signal only by the motion vector resulting from hand movement. In the case where the motion vector resulting from movement of the object is erroneously judged as a motion vector resulting from a hand movement to carry out a hand movement correction, a background image which should be stationary would move by such hand movement correction, resulting in an unnatural image.

OBJECTS

A principal object of this invention is to provide an apparatus for judging a movement of the hand of an image, which can securely judge whether or not a motion vector of an image is a motion vector of an image resulting from a hand movement or a motion vector resulting from a relative movement of an object.

Another object of this invention is to provide an apparatus for correcting a hand movement, in which the above-mentioned hand movement judgment apparatus is applied, thereby making it possible to carry out a high performance hand movement correction in a video camera of the handy type, or the like.

SUMMARY OF THE INVENTION

To achieve the above-mentioned objects of this invention, in accordance with this invention, there is provided an apparatus for judging a hand movement of an image, which comprises: a memory for storing values $I_k(0, 0)$ of image data of representative point pixels every plural blocks obtained by dividing an image of one frame comprised of an input video signal; difference detection means for detecting absolute values $|\{I_{k-1}(0, 0) - I_k(x, y)\}|$ of differences between image data $I_k(x, y)$ of respective pixels of blocks of a current frame and image data $I_{k-1}(0, 0)$ of representative point pixels of blocks of an earlier frame read out from the memory; condition judgment means for judging whether or not the frame difference absolute values $|\{I_{k-1}(0, 0) - I_k(0, 0)\}|$ of respective blocks detected by the differential detection means satisfy the first judgment condition expressed below, $I_{k-1}(0, 0) \neq I_k(0, 0)$, and the second judgment condition expressed below: $|\{I_{k-1}(0, 0) - I_k(x, y)\}| \geq Th_j$;

where a threshold value of judgment is $Th_j$; frequency distribution table formation means adapted for incrementing a frequency $f(x, y)$ of coordinates corresponding to pixel arrangement of one block every a pixel to satisfy the above conditions is detected on the basis of a judgment output by the condition judgment means to form a frequency distribution table; and hand movement vector judgment means adapted to calculate the number of coordinates having a frequency value greater than a predetermined value of a plurality of coordinates in the vicinity of a coordinate designated by a motion vector of an image with respect to the frequency distribution table formed by the frequency distribution table formation means to judge the motion vector to result from a hand movement of an image then the calculated value is smaller than a predetermined value.

In the above-mentioned hand movement judgment apparatus, the hand movement vector judgment means may be adapted for judging the motion vector to result from a hand movement, of an image when an average value of frequency values of a plurality coordinates in the vicinity of a coordinate designated by a motion vector of an image with respect to the frequency distribution table formed by the frequency distribution table formation means.

In addition, there is provided an apparatus for implementing a hand movement correction processing to an input video signal, comprising a motion vector detection unit for storing, for a time period of one field, into a memory, image data $I_k(0, 0)$ of representative point pixels every plural blocks obtained by dividing an image of one field comprised of an input video signal, thus to detect motion vectors of image on the basis of absolute values $|I_{k-1}(0, 0) - I_k(x, y)|$ of differences between $I_k(x, y)$ of the respective pixels of a block of a current field and image data $I_{k-1}(0, 0)$ of representative point pixels of an earlier field; a noise reduction filter for reducing or eliminating any noise component of the input video signal; an hand movement judgment unit adapted for storing, for a time period of one field, into a memory, image data $I_k(0, 0)$ of representative point pixels every plural blocks obtained by dividing an image of one field comprised of an input video signal from which a noise component is reduced or eliminated by the noise reduction filter to judge whether or not absolute values $|I_{k-1}(0, 0)-I_k(x, y)|$ of differences between image data $I_k(x, y)$ of respective pixels of blocks of a current block and image data $I_{k-1}(0, 0)$ of representative point pixels of blocks of an earlier field satisfy the first judgment condition expressed below, $I_{k-1}(0, 0) \neq I_k(0, 0)$ the second judgment condition expressed below $|\{I_{k-1}(0, 0)-I_k(x, y)\}| \geq TH_I$ to increment a frequency (x, y) of coordinates corresponding to a pixel arrangement every time a pixel satisfying the first and second conditions is detected to form a frequency distribution table, thus to judge a motion vector detected by the motion vector detection unit to result from a hand movement of the image when a frequency value of a coordinate designated by the motion vector is smaller than a predetermined value; a correction quantity generation unit for forming a hand movement correction signal of a correction quantity corresponding to the motion vector which has been judged to result from a hand movement of the image by the hand movement judgment unit, and a correction unit for implementing an hand movement correction processing to the input video signal by the hand movement correction signal delivered from the correction quantity generation unit.

DESCRIPTION OF THE PREFERRED EMBODIMENTS

An embodiment of an apparatus for judging a hand movement of an image according to this invention will now be described with reference to the attached drawings.

Figure 1:
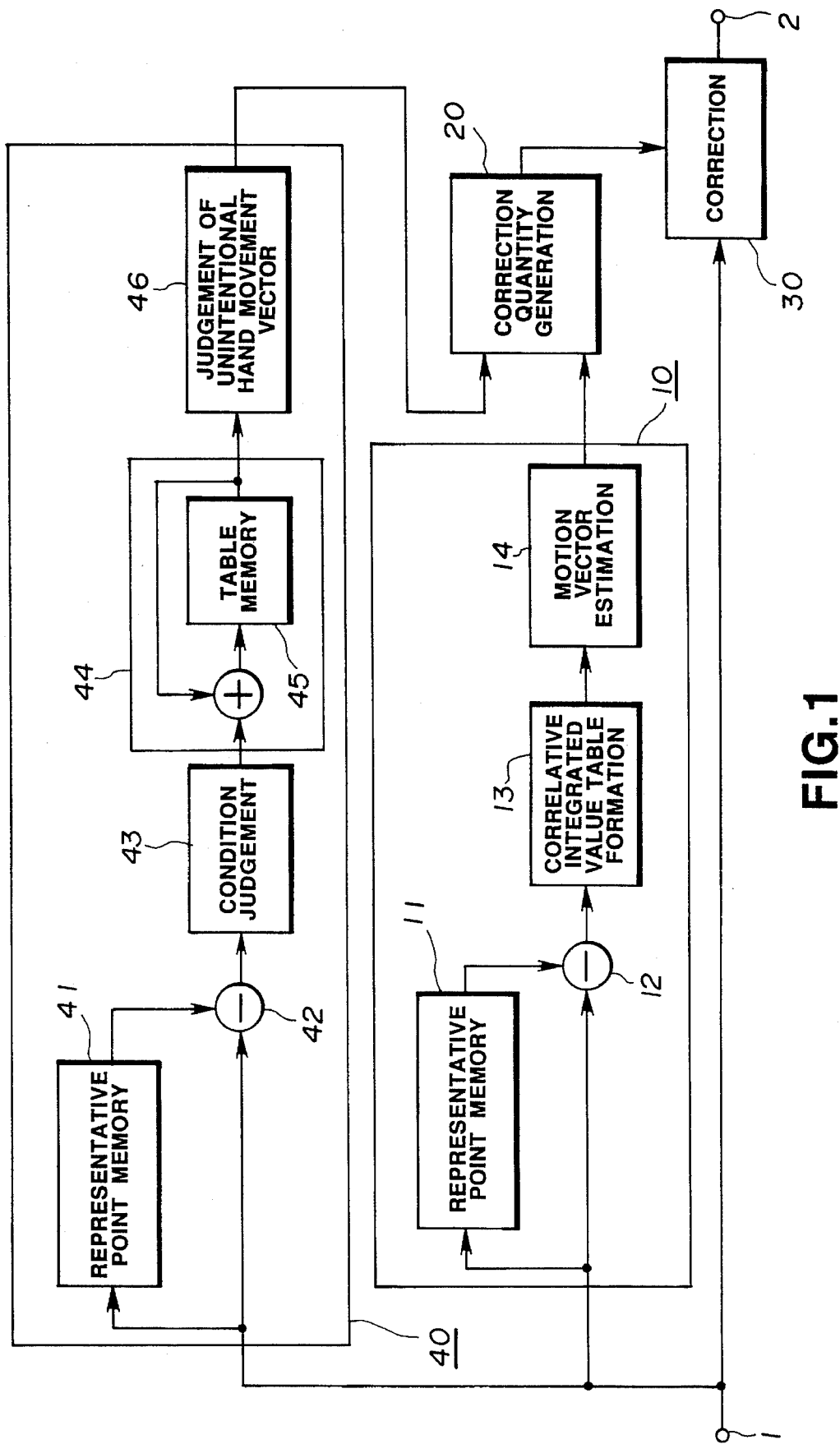
FIG. 1 is a block diagram showing an embodiment of an apparatus for judging a hand movement of an image according to this invention.

An apparatus for judging a hand movement of an image according to this embodiment is constructed as shown in FIG. 1, for example.

In the unit 40 for judging a hand movement of an image shown in FIG. 1, this invention is applied to a hand movement correction apparatus for correcting motion of an image due to a hand movement in a video camera of the handy type. The hand movement judgment unit 40 constitutes a hand movement correction apparatus together with a unit 10 for detecting a motion vector of an image, a correction quantity generator 20, and a correction unit 30.

In FIG. 1, an input video data provided by digitizing a video signal obtained as an image pickup output by an imaging unit (not shown) of the video camera is delivered to a signal input terminal 1.

In this hand movement correction apparatus, the above-mentioned motion vector detection unit 10 comprises a representative point memory 11 and a subtracter 12 which are supplied with the input video data through the signal input terminal 1, a correlative integrated value table formation circuit 13 supplied with subtraction output data by the subtracter 12, and a motion vector estimation circuit 14 supplied with correlative integrated value data of the correlative integrated value table formed by the correlative integrated value formation circuit 13.

Figure 2:
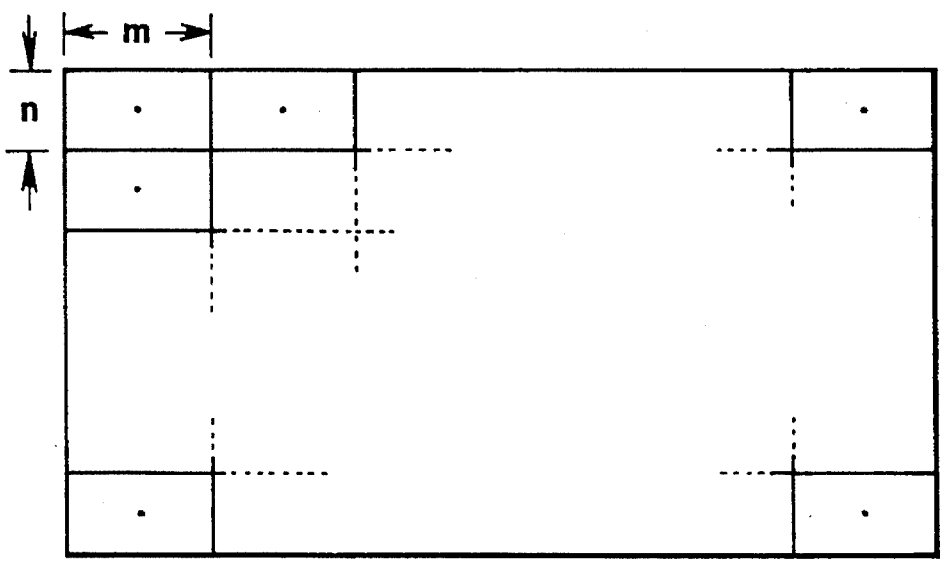
FIG. 2 is a schematic diagram showing the state where a picture is divided into blocks in a motion vector detection unit of the apparatus for judging a hand movement of an image shown in FIG. 1.
Figure 3:
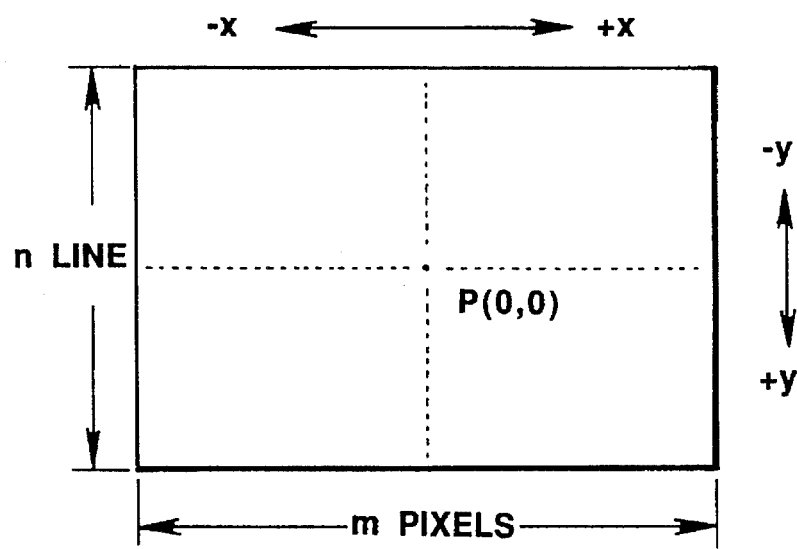
FIG. 3 is a schematic diagram showing the structure of one block of the picture divided into blocks shown in FIG. 2.

The representative point memory 11 in the motion vector detection unit 10 stores values of image data of representative point pixels every plural blocks obtained by dividing an image of one frame comprised of the input video data. In actual terms, as shown in FIG. 2, for example, a picture of one frame is divided into blocks having m pixels ×n lines to assume pixels at central points of respective blocks as representative points as shown in FIG. 3 to store image data of respective representative point pixels into the representative point memory 11 for a time period of one frame. It is to be noted that the above-mentioned representative points are uniformly scattered or distributed. Image data of respective representative point pixels earlier by one frame, which are read out from the representative point memory 11, are delivered to the subtracter 12.

The subtracter 12 detects an absolute value of a difference i.e. , a difference between frames between image data of respective m×n pixels every block and image data of representative point pixels of a corresponding block in an earlier frame which are read from the representative point memory 11 with respect to input video data delivered through the signal input terminal, i.e., image data of a current frame. The frame difference absolute value obtained as subtraction output data by the subtracter 12 is delivered to the correlative integrated value table formation circuit 13.

The correlative integrated value table formation circuit 13 integrates frame difference absolute values of respective blocks obtained by the subtracter 12 over one frame period every corresponding pixels, thus to form a correlative integrated value table having m×n integer coordinates corresponding to a pixel arrangement of one block. The correlative integrated value table formed by the correlative integrated value table formation circuit 13 indicates a distribution of integrated values of m×n frame difference absolute values, i.e., correlative integrated values. In this distribution, a correlation integrated value at the coordinates where the frame correlation is the highest serves as a minimum value. Then, m×n correlative integrated values of the correlative integrated value table formed by the correlative integrated value table formation circuit 13 are delivered to the motion vector estimation circuit 14.

The motion vector estimation circuit 14 detects coordinates of a minimum value of the correlative integrated values of the correlative integrated value table formed by the correlative integrated value table formation circuit 13 to calculate coordinates obtained by proportionally dividing a distance between pixels corresponding to the distance between peripheral coordinates with a correlative integrated value at the peripheral coordinate where the coordinates of the minimum value are positioned at the center being as a proportion factor to estimate a motion vector of an image on the basis of the above coordinates.

Figure 4:
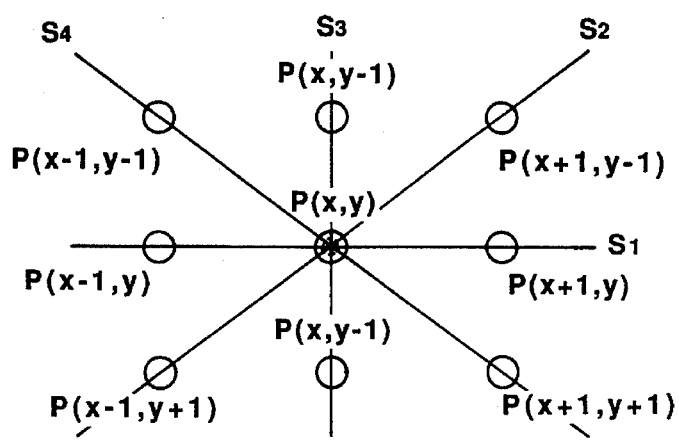
FIG. 4 is a schematic diagram for explaining the axis in the vicinity of a minimum value on a correlative integrated value table used for an estimation processing of a motion vector in the motion vector detection unit of the apparatus for judging a hand movement of an image shown in FIG. 1.

Here, the estimation processing of a motion vector of an image in the motion vector estimation circuit 14 can be carried out in a two-dimensional separable manner by using four axes $S_1$, $S_2$, $S_3$ and $S_4$ passing through two coordinates of a coordinate P(x, y) of a minimum value of the correlative integrated value and eight coordinates P(x+1, y), P(x+1, y+1), P(x, y+1), P(x−1, y+1), P(x−1, y), ,P(x−1, y−1), P(x, y−1) and P(x+1, y−1) in the vicinity thereof, as shown in FIG. 4, for example.

The motion vector estimation circuit 14 detects a coordinate of a minimum value of correlative integrated values with respect to the correlative integrated value table formed by the correlative integrated value table formation circuit 13 to carry out an estimation processing of the coordinate of the minimum values with respect to the above-mentioned four axes $S_1$, $S_2$, $S_3$ and $S_4$ to synthesize estimated coordinates of respective axes $S_1$, $S_2$, $S_3$ and $S_4$ to calculate a two-dimensional coordinate value to determine a motion vector of an image from the two-dimensional coordinate value.

The motion vector estimation circuit 14 delivers, to the apparatus for judging an hand movement, the coordinate of the minimum value of the correlative integrated values indicated by the integer coordinate values of the correlative integrated value table as a motion vector of an image.

Figure 5:
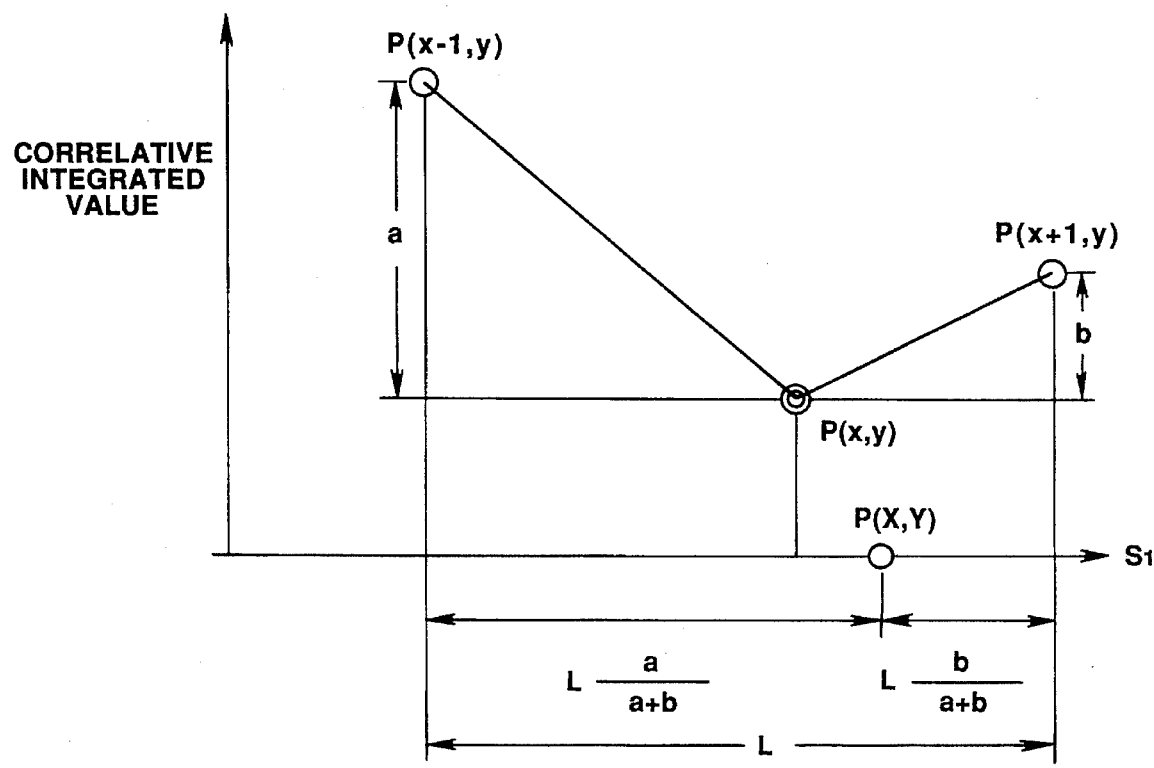
FIG. 5 is a schematic diagram for explaining an example one-dimensional estimation of a motion vector in the motion vector detection unit of the apparatus for judging a hand movement of an image shown in FIG. 1.

When it is now assumed that the correlative integrated value of the coordinate P(x, y) in the center as shown in FIG. 5, e.g., in the axis $S_1$ is a minimum value, and that there exist, differences a and b between correlation integrated values of adjacent coordinates P(x+1, y) and P(x−1, y) and the above-mentioned minimum correlation integrated value, one-dimensional estimation of the coordinate of the minimum value with respect to a certain axis is carried out by calculating a coordinate, P(X, Y) proportionally dividing the length L between adjacent coordinates at a ratio of a/(a+b) to b/(a+b). Thus, the minimum value coordinate can be calculated at a resolution finer than those of the integer coordinate values of the correlative integrated value table. It is to be noted that estimation corresponding to changes in respective correlative integrated values of the adjacent coordinates P(x+1, y), P(x−1, y) by varying weights α, β of a proportional coefficient for proportionally dividing the length L between adjacent coordinates as indicated by α.a/(a+b):β.b/(a+b).

The image motion vector detection unit 10 thus constructed detects a coordinate of a minimum value of correlative integrated values of the correlative integrated value table formed by the correlative integrated value formation circuit 13 to thereby obtain an integer coordinate value to calculate a coordinate proportionally dividing the distance between pixels corresponding to the distance between peripheral coordinates with a correlative integrated value at the peripheral coordinate where the above-mentioned coordinate is positioned at the central portion being as a proportion coefficient, thereby making it possible to provide an integer coordinate value. Since a motion vector of an image is estimated on the basis of this coordinate, it is possible to detect the motion vector with a high accuracy.

The motion vector detected by the motion vector detection unit 10 is delivered to the correction quantity generation unit 30.

In the hand movement correction apparatus, the hand movement judgment unit 40 comprises a representative point memory 41 and a subtracter 42 supplied with the input video data through the signal input terminal 1, a condition judgment circuit 43 supplied with subtraction output data by the subtracter 42, a frequency distribution table formation unit 44 for forming a frequency distribution table on the basis of a judgment output by the condition judgment circuit 43, and a hand movement judgment circuit 46 adapted to carry out, on the basis of a frequency value of the frequency distribution table formed by the frequency table formation circuit 44, a judgment processing as to whether or not a motion vector detected by the motion vector detection unit 10 is a motion vector of an image due to an hand movement.

In the hand movement judgment unit 40, the representative point memory 41 stores, for a time period of one frame, in the same manner as in the representative point memory 11 in the above-described hand movement vector detection unit 10, the value $I_k(0, 0)$ of image data of representative point pixels every plural blocks obtained by dividing an image of one frame comprised of the input video data. Image data of respective representative point pixels earlier by one frame which are read out from the representative point memory 41 are delivered to the subtracter 42.

The subtracter 42 detects an absolute value of a difference $|\{I_{k-1}(0, 0)-I_k(x, y)\}|$ between image data $I_k(x, y)$ of m×n pixels every block and image data $I_{k-1}(0, 0)$ of a representative point pixel of a corresponding block in an earlier frame read out from the representative point memory 41, i.e., an absolute value of a difference between frames. The frame difference absolute value data obtained as subtraction output data by the subtracter 42 is delivered to the condition judgment circuit 43.

The condition judgment circuit 43 judges whether or not the frame difference absolute value of each block detected by the subtracter 42 satisfies the first judgment condition expressed below, $I_{k-1}(0, 0) \neq K_k(0, 0)$
and the second judgment condition expressed below $|\{I_{k-1}(0, 0)-I_k(x, y)\}| \geq Th_t$
where $Th_t$ is a threshold value for judging presence or absence of a level difference in a space. A judgment output by the condition judgment circuit 43 is delivered to the frequency distribution table formation circuit 44.

The frequency distribution formation circuit 44 includes a memory table 45 having coordinates corresponding to a pixel arrangement of one block to increment, on the basis of the judgment output by the condition judgment circuit 43, a frequency f(x, y) of a corresponding coordinate every time a pixel satisfying the above-mentioned first and second conditions is detected, thus to form a frequency distribution table in the memory table 45. Frequency values of the frequency distribution table formed in the memory table 45 by the frequency distribution table formation circuit 44 is delivered to the hand movement vector judgment circuit 46.

Figure 6:
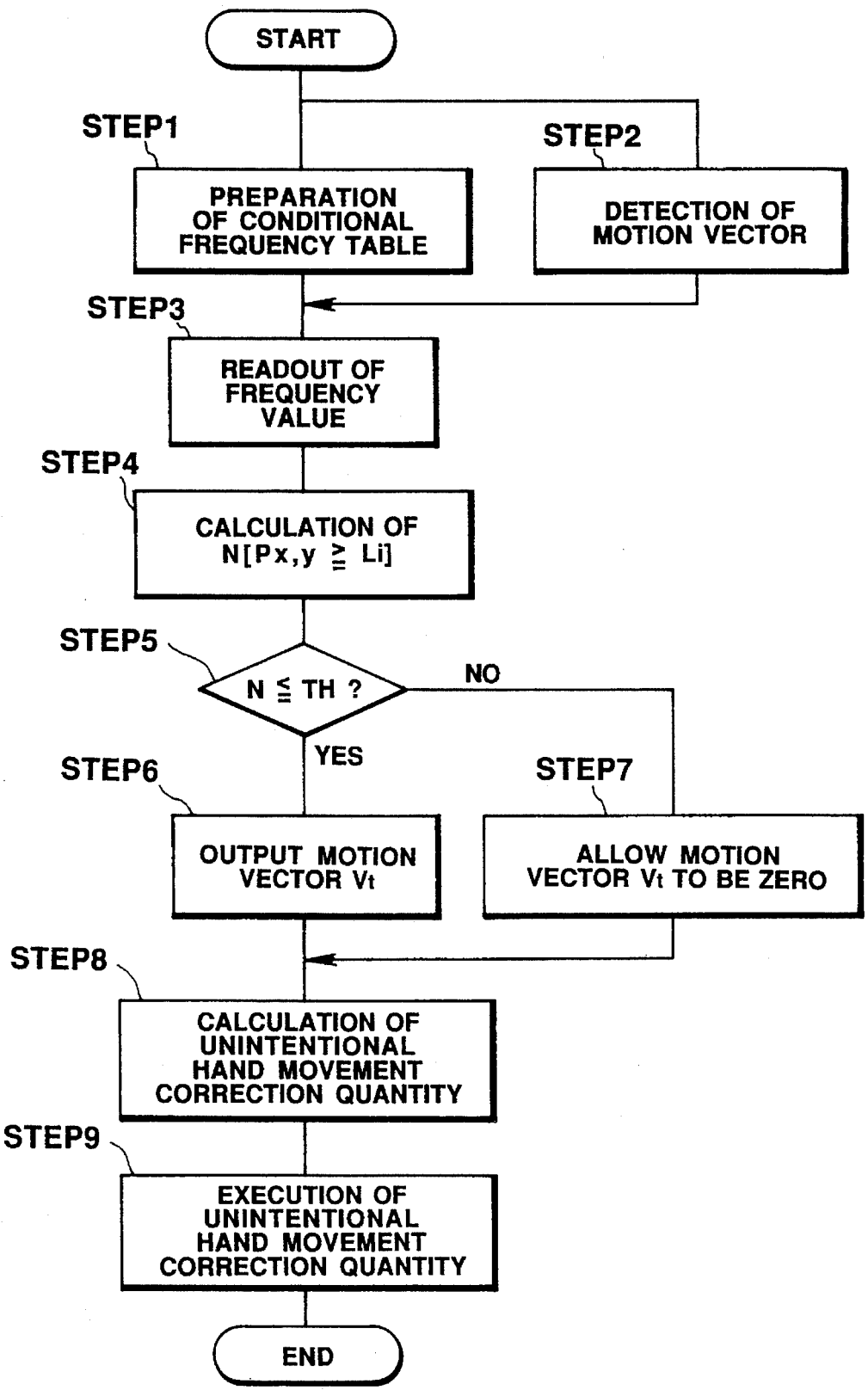
FIG. 6 is a flowchart showing the operation of the apparatus for judging a hand movement of an image shown in FIG. 1.

The hand movement vector judgment circuit 46 reads out, from the memory table 45 of the frequency distribution table formation circuit 44, at step 3, frequency values of a plurality of coordinates in the vicinity of the coordinate P(x, y) designated by the motion vector $V_t$ of an image detected by the motion vector detection unit 10 at step 2 with respect to the frequency distribution table formed by the frequency distribution table formation circuit 44 at step 1, as shown in the flowchart of FIG. 6. After the number of coordinates $N[P_{i,j} \geq L_{th}]$ having a frequency value greater than a predetermined value $L_{th}$ of a plurality of coordinates in the vicinity of the coordinate P(x, y) of the motion vector $V_t$ read out at the step 3 is calculated at step 4, judgment processing as to whether of not the number $N[P_{i,j} \geq L_{th}]$ is smaller than a predetermined value $Th_j$ is carried out at step 5. In the case where the judgment result at the step 5 is "YES", i.e., the number $N[P_{i,j} \geq L_{th}]$ is smaller than the predetermined value $Th_j$, a judgment output indicating that the motion vector $V_t$ results from an unintentional hand movement of an image is delivered to the correction quantity generation unit 30. In contrast, in the case where the judgment result at the step 5 is "NO", i.e., the number $N[P_{i,j} \geq L_{th}]$ is greater than the predetermined value $Th_j$, a judgment output indicating that the motion vector $V_t$ does not result from a hand movement of an image is delivered to the correction quantity generation unit 30.

Figure 7:
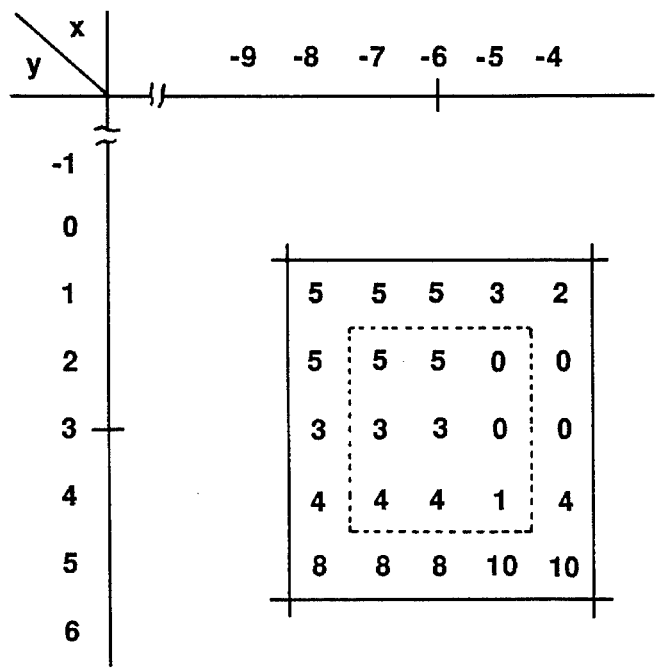
FIG. 7 is a schematic diagram showing a frequency distribution in the vicinity of a motion vector of the frequency distribution table formed by the frequency distribution table formation circuit in the apparatus for judging a hand movement shown in FIG. 1 with respect to an image to which motion resulting from an hand movement is given.

At a plurality of coordinates in the vicinity of the coordinate P(x, y) designated by the motion vector $V_t$ of an image detected by the motion vector detection unit 10, in the case of an image to which motion resulting from to an hand movement is given, as an example of frequency values of respective coordinates in the vicinity of the coordinate P(−6, 3) of the motion vector $V_t$ of the frequency distribution table formed by the frequency distribution table formation circuit 44 is shown in FIG. 7, since the frame difference absolute values $|\{I_{k-1}(O, O)-I_k(x, y)\}|$ of respective blocks detected by the subtracter 42 becomes small, respective frequency values also become small, so its spatial average value $A_t$ becomes small. In the frequency distribution table of an image to which motion resulting from a hand movement is given shown in FIG. 7, at the coordinate P(−6, 3) designated by the motion vector $V_t$ of an image and eight coordinates in the vicinity thereof (the portion within a frame indicated by broken lines of FIG. 7), when the predetermined value $L_{th}$ used for judgment at the step 5 is assumed to be "6", the number N of coordinates $[P_{i,j} \geq K_{th}]$ of frequency values above the predetermined value $L_{th}$=6 is zero. Further, at the coordinate P(−6, 3) and sixteen coordinates in the vicinity thereof (the portion within the frame indicated by solid line of FIG. 7), When the predetermined value $L_{th}$ used for judgment at the step 5 is assumed to be "9", the number N of coordinates $[P_{i,j} \geq L_{th}]$ of frequency values above the predetermined value $L_{th}$=9 is two.

Figure 8:
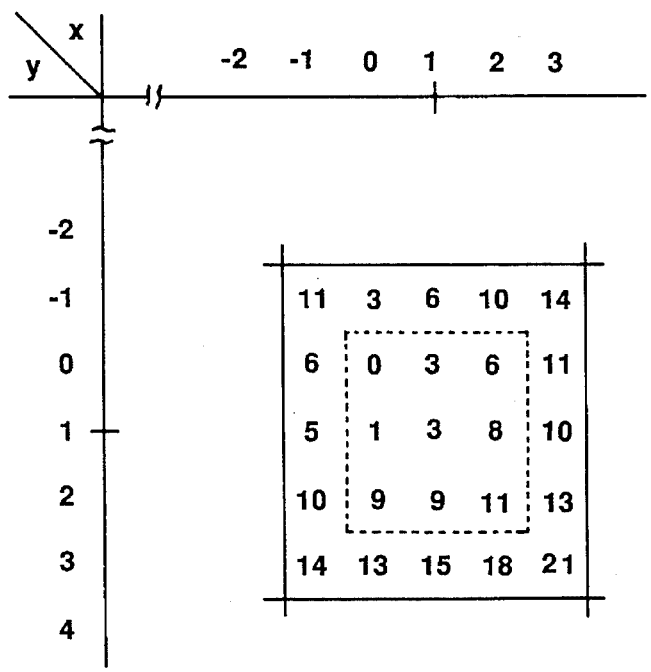
FIG. 8 is a schematic diagram showing a frequency distribution in the vicinity of a motion vector of the frequency distribution table formed by the frequency distribution table formation circuit in the apparatus for judging a hand movement shown in FIG. 1 with respect to an image obtained by a fixed video camera.

On the contrary, in the case of an image obtained by a fixed video camera, as an example of frequency values of respective coordinates in the vicinity of the coordinate P(1, 1) of the motion vector $V_t$ of the frequency distribution table formed by the frequency distribution table formation circuit 44 is as shown in FIG. 8, a pixel having frame difference absolute values $|\{I_{k-1}(0, 0)-I_k(x, Y)\}|$ great to some extent is detected. Respective frequency values become large and its spatial average value $A_t$ becomes large. In the frequency distribution table of an image obtained by a fixed video camera shown in FIG. 8, at the coordinate P(1,1) designated by the motion vector $V_t$ of an image and eight coordinates in the vicinity thereof (the portion within the frame indicated by broken lines of FIG. 8), when the predetermined value $L_{th}$ used for judgment at the step 5 is assumed to be "6", the number N of coordinates $[P_{i,j} \geq L_{th}]$ of frequency values above the predetermined value $L_{th}$=6 is five. Further, at the coordinate P(1, 1) and sixteen coordinates in the vicinity thereof (the portion within the frame indicated by solid lines of FIG. 7), when the predetermined value $L_{th}$ used for judgment at the step 5 is assumed to be "9", the number N of coordinates $[P_{i,j} \geq L_{th}]$ of frequency values above the predetermined value $L_{th}$=9, is twelve.

The frequency value of the coordinate P(−6, 3) designated by the motion vector $V_t$ of an image in the frequency distribution table of an image to which motion resulting from a hand movement is given shown in FIG. 7 is "3". Further, the frequency Value of the coordinate P(1, 1) designated by the motion vector $V_t$ of an image in the frequency distribution table of an image obtained by the fixed video camera shown in FIG. 8 is also "3". Only by the frequency value of the coordinate P(x, y) designated by the motion vector $V_t$ detected by the motion vector detection unit 10, it is impossible to judge whether or not the motion vector $V_t$ results from a hand movement. However, since there exist differences as described above in the number N of coordinates $[P_{i,j} \geq L_{th}]$ obtained by allowing respective frequency values at eight coordinates or sixteen coordinates in the vicinity of the coordinate P(x, y) designated by the motion vector $V_t$ to undergo threshold-judgment by the predetermined value $L_{th}$, such numeric value N $[P_{i,j} \geq L_{th}]$ is used, thereby making it possible to securely judge whether the motion vector $V_t$ of image is a motion vector of an image resulting from an hand movement, or a motion vector resulting from a movement of an object.

As stated above, an approach is employed to calculate the number N of coordinates $[P_{i,j} \geq L_{th}]$ having a frequency value greater than the predetermined value $L_{th}$ of a plurality of coordinates in the vicinity of the coordinate P(x, y) designated by the motion vector $V_t$ of image detected by the motion vector detection unit 10 to judge the motion vector to result from an hand movement of an image when the calculated value N $[P_{i,j} \geq L_{th}]$ is smaller than a predetermined value, thereby making it possible to securely judge whether the motion vector $V_t$ of image is a motion vector of image resulting from a hand movement or a motion vector resulting from a relative movement of an object.

When a judgment output indicating that the motion vector $V_t$ detected by the motion vector detection unit 10 results from a hand movement is delivered from the hand movement vector judgment device 40 to the correction quantity generator 20, this generator 20 assumes the motion vector $V_t'$ detected by the motion vector detection unit 10 at the step 6 in the flowchart of FIG. 6 to be an hand movement vector to form a hand movement correction signal to deliver this hand movement correction signal to the correction unit 30. Further, when a judgment output indicating that the motion vector $V_t$ detected by the motion vector detection unit 10 does not result from a hand movement of an image is delivered from the hand movement vector judgment device 40 to the correction quantity generator 20, this generator allows the hand movement vector to be [0, 0] at step 7 in the flowchart of FIG. 6 to form a hand movement correction signal to deliver this hand movement correction signal to the correction unit 30.

Another embodiment of the operation of the hand movement vector judgment circuit 46 will now be described with reference to the flowchart of FIG. 9.

Figure 9:
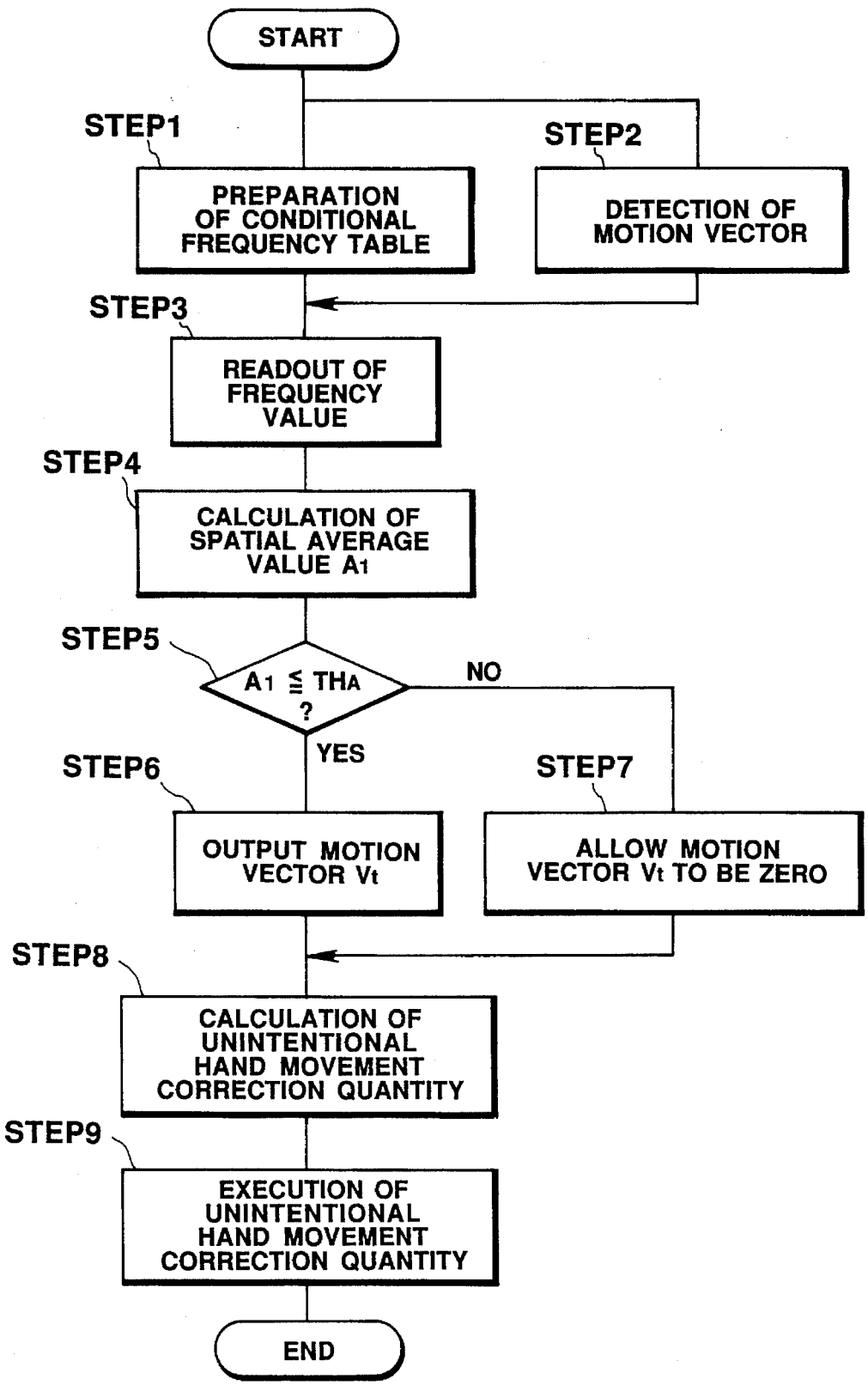
FIG. 9 is a flowchart showing another example of the operation of the apparatus for judging a hand movement of an image shown in FIG. 1.

The hand movement vector judgment circuit 46 reads out, from the memory table 45 of the frequency distribution table formation circuit 44, at step 3, frequency values of a plurality of coordinates in the vicinity of the coordinate P(x, y) designated by the motion vector $V_t$ of an image detected by the motion vector detection unit 10 at step 2 with respect to the frequency distribution table formed by the frequency distribution table formation circuit 44 at step 1, as shown in the flowchart of FIG. 9. After an average value $A_t$ of frequency values of a plurality of coordinates in the vicinity of the coordinate P(x, y) of the motion vector $V_t$ read out at the step 3 is calculated at step 4, judgment processing as to whether or not this average value $A_t$ is smaller than a predetermined value $Th_A$ is carried out at step 5. In the case where the judgment result at the step 5 is "YES", i.e., the average value $A_t$ is smaller than the predetermined value $Th_A$, a judgment output indicating that the motion vector $V_t$ results from a hand movement of an image is delivered to the correction quantity generator 30. In contrast, in the case where the judgment result at the step 5 is "NO", i.e., the average value $A_t$ is greater than the predetermined value $Th_A$, a judgment output indicating that the motion vector $V_t$ does not result from an hand movement of an image is delivered to the correction quantity generator 30.

At a plurality of coordinates in the vicinity of the coordinate. P(x, y) designated by the motion vector $V_t$ of an image detected by the motion vector detection unit 10, in the case of an image to which motion resulting from a hand movement is given, as an example of frequency values of respective coordinates in the vicinity of the coordinate P(−6, 3) of the motion vector $V_t$ of the frequency distribution table formed by the frequency distribution table formation circuit 44 is as shown in FIG. 7, since the frame difference absolute values $|\{I_{k-1}(0, 0) - I_k(x, y)\}|$ of respective blocks detected by the subtracter 42 become small, respective frequency values also become small, so its spatial average value $A_t$ becomes small. In the frequency distribution table of an image to which motion resulting from a hand movement is given shown in FIG. 7, the sum total SUM of respective frequency values at the coordinate P(−6, 3) designated by the motion vector $V_t$ of an image and eight coordinates in the vicinity thereof (the portion within a frame indicated by broken lines of FIG. 7) is "25, and its spatial average value $A_t$ is "3.13". Further, the sum total SUM of respective frequency values at the coordinate P(−6, 3) and sixteen coordinates in the vicinity thereof (the portion within the frame indicated by solid line of FIG. 7), and its spatial average value $A_t$ is "4.38".

On the contrary, in the case of an image obtained by a fixed video camera, as an example of frequency values of respective coordinates in the vicinity of the coordinate P(1, 1) of the motion vector $V_t$ of the frequency distribution table formed by the frequency distribution table formation circuit 44 is as shown in FIG. 8, pixels having frame difference absolute value $|\{I_{k-1}(0, 0) - I_k(x, Y)\}|$ greatly to some extent are detected. Respective frequency values become large and its spatial average value $A_t$ also becomes large. In the frequency distribution table of an image obtained by the fixed video camera shown in FIG. 8, the sum total SUM of respective frequency values at the coordinate P(1, 1) designated by the motion vector $V_t$ of image and eight coordinates in the vicinity thereof (the portion within the frame indicated by broken lines of FIG. 8) is equal to "50", and its spatial average value $A_t$ is equal to "6.25" (the portion within the frame indicated by solid lines of FIG. 8). Further, the sum total SUM of respective frequency values at the coordinate P(1, 1) and sixteen coordinates in the vicinity thereof is equal to "230", and its spatial average value $A_t$ is equal to "9.58".

The frequency value of the coordinate P(−6, 3) designated by the motion vector $V_t$ of image in the frequency distribution table of image to which motion resulting from hand movement is given shown in FIG. 7 is equal to "3", and the frequency value of the coordinate P(1, 1) designated by the motion vector $V_t$ of image in the frequency distribution table of an image obtained by the fixed video camera shown in FIG. 8 is also equal to "3". Only by the frequency value of the coordinate P(x, y) designated by the motion vector $V_t$ detected by the motion vector detection unit 10, it is impossible to judge whether or not the motion vector $V_t$ results from a hand movement. However, since there clearly exist differences as described above in the spatial average value $A_t$ of respective frequency values at eight coordinates in the vicinity of the coordinate P(x, y) designated by the motion vector $V_t$ of image or sixteen coordinates in the vicinity thereof, this spatial average value $A_t$ is used, thereby making it possible to securely judge whether or not the motion vector $V_t$ of image is a motion vector of an image due to a movement of the hands, or a motion vector due to a relative movement of an object.

As stated above, an approach is employed to calculate a spatial average value $A_t$ of frequency values of a plurality of coordinates in the vicinity of the coordinate P(x, y) designated by the motion vector $V_t$ of image detected by the motion vector detection unit 10 to judge the motion vector $V_t$ to result from a hand movement of image when the spatial average value $A_t$ is smaller than the predetermined value $Th_A$, thereby making it possible to securely judge whether or not the motion vector $V_t$ of image is a motion vector of an image resulting from a hand movement, or a motion vector resulting from a relative movement of an object. Further, since the frame difference absolute value correlate to an activity in a space of an image, i.e., whether or not a large number of edges exist, there results an increased reliability in the hand movement judgment by the spatial average value $A_t$ of frequency values in the vicinity of the coordinate P(x, y) of the motion vector $V_t$.

When a judgment output indicating that the motion vector $V_t$ detected by the motion vector detection unit 10 results from a hand movement of an image is delivered from the hand movement vector judgment device 40 to the correction quantity generator 20, this generator 20 considers the motion vector $V_t'$ detected by the motion vector detection unit 10 at the step 6 of the flowchart of FIG. 6 as a hand movement vector to form a hand movement correction signal to deliver this hand movement correction signal to the correction unit 30. Further, when a judgment output indicating that the motion vector $V_t$ detected by the motion vector detection unit 10 does not result from an hand movement of an image is delivered from the hand movement vector judgment device 40 to the correction quantity generator 20, this generator 20 allows the hand movement vector to be [0, 0] at step 7 in the flowchart of FIG. 6 to form a hand movement correction signal to deliver this hand movement correction signal to the correction unit 30.

Figure 10:
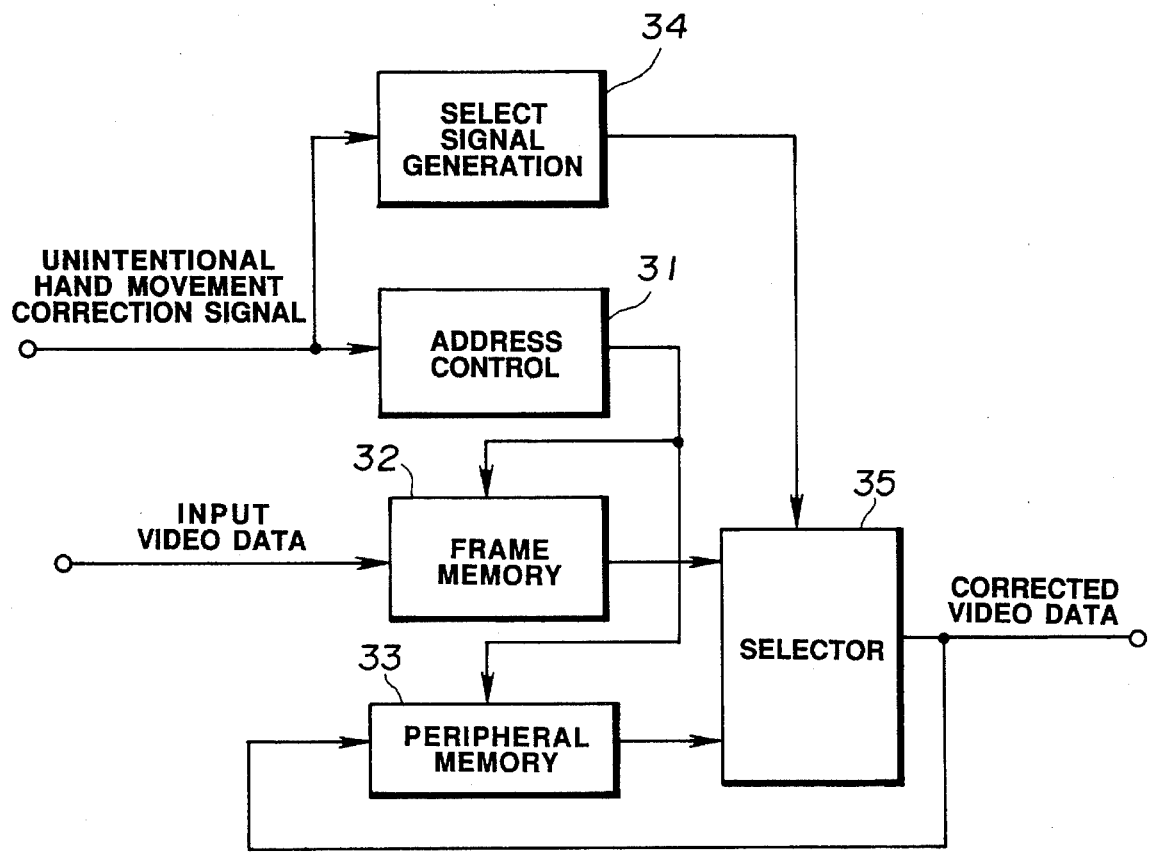
FIG. 10 is a schematic diagram showing the configuration of a correction unit in the apparatus for judging a hand movement shown in FIG. 1.

Further, the correction unit 30 comprises, as shown in FIG. 10, for example, an address control circuit 31 and a select signal generator 42 which are supplied with a hand movement correction signal from the correction quantity generator 20, a frame memory 33 and a peripheral memory 34 in which a write/readout operation of data is carried out in accordance with an address signal delivered from the address control circuit 31, and a selector 35 for selectively outputting video data read out from the frame memory 33 and the peripheral memory 34 in accordance with a select signal delivered from the select signal generator 32.

Into the frame memory 32, input video data delivered through the signal input terminal 1 are written in sequence. The readout address of the frame memory 32 is controlled in dependency upon the hand movement vector by the hand movement correction signal. Thus, video data in which input video data of one frame is moved in dependency upon the hand movement vector is provided from the frame memory 32. The video data read out from the frame memory 32 and peripheral video data read out from the peripheral memory 33 are synthesized by selection by the selector 35. The data thus synthesized is outputted from the signal output terminal 2 as video data which has undergone hand movement processing.

It is to be noted that video data at the peripheral potion corresponding to the correction range of an image by video data which has undergone hand movement correction processing, outputted through the selector 35, are written in sequence into the peripheral memory 33 as peripheral data.

Since a motion vector of an image can be detected with high accuracy by the motion vector detection unit 10 as described above, in a hand movement correction device adapted for carrying out a hand movement correction on the basis of this motion vector, a high hand movement correction accuracy can be ensured and a natural image output can be provided.

As is clear from the foregoing description, an apparatus for judging a hand movement of an image according to this invention stores, into the memory, values $I_k(0, 0)$ of image data of representative point pixels every plural blocks obtained by dividing an image of one frame comprised of input video to judge by condition judgment means whether or not an absolute value $|\{I_{k-1}(0, 0) - I_k(x, y)\}|$ of a difference between image data $I_k(x, y)$ of respective pixels of a block of a current frame and image data $I_{k-1}(0, 0)$ of representative point pixels of the block earlier by one frame read out from the memory, which is detected by the difference detection means, satisfies the first judgment condition expressed below; and $I_{k-1}(0, 0) \neq I_k(0, 0)$ the second judgment condition $|\{I_{k-1}(0, 0) - I_k(x, y)\}| \geq Th_f$ where the threshold value of judgment is $Th_f$ to increment the frequency f(x, y) every time a pixel satisfying the above conditions is detected to form a frequency distribution table by the frequency distribution table formation means. Then, the hand movement vector judgment means calculates the number of coordinates having a frequency value greater than a predetermined value of a plurality of coordinates in the vicinity of the coordinate designated by the motion vector of image with respect to the frequency distribution table formed by the frequency distribution table formation means to judge the motion vector to result from a hand movement of image when the calculated value is smaller than a predetermined value, thereby making it possible to securely judge whether a motion vector of an image detected by the device for detecting a motion vector of an image is a motion vector of an image resulting from a hand movement or a motion vector resulting from a relative movement of an object.

Further, the apparatus for judging a hand movement of an image according to this invention stores, into the memory, a value $I_k(0, 0)$ of image data of representative point pixels every plural blocks obtained by dividing an image of one frame comprised of an input video signal to judge by the condition judgment means whether or not an absolute value $|\{I_{k-1}(0, 0) - I_k(x, y)\}|$ of a difference between image data $I_k(x, y)$ of respective pixels of a block of a current frame and image data $I_{k-1}(0, 0)$ of representative point pixels of the block of an earlier frame read out from the memory, which is detected by the difference detection means, satisfies the first judgment condition expressed below; and $I_{k-1}(0, 0) \neq I_k(0, 0)$ the second judgment condition expressed below $|\{I_{k-1}(0, 0) - I_k(x, y)\}| \geq Th_f$ where a threshold value of judgment is $Th_f$ to increment the frequency f(x, y) every time a pixel satisfying the above conditions is detected to form a frequency distribution table by the frequency distribution table formation means. Then, the hand movement vector judgment means calculates a spatial average value of frequency values of a plurality of coordinates in the vicinity of the coordinate designated by the motion Vector of image with respect to the frequency distribution table formed by the frequency distribution table formation means to judge the motion vector to result from a movement of the hands of an image when the spatial average value is smaller than a predetermined value, thereby making it possible to securely judge whether the motion vector of image detected by the device for detecting a motion vector of image is a motion vector of an image resulting from a hand movement, or a motion vector resulting from a relative movement of an object.

Accordingly, in accordance with this invention, an apparatus for judging motion of an image capable of securely judging whether or not a motion vector of an image results from a hand movement can be provided. Thus, high performance hand movement correction in a video camera of the handy type, etc. can be made.

Another embodiment of an apparatus for judging a hand movement of an image according to this invention will now be described with reference to FIGS. 11 to 17.

Figure 11:
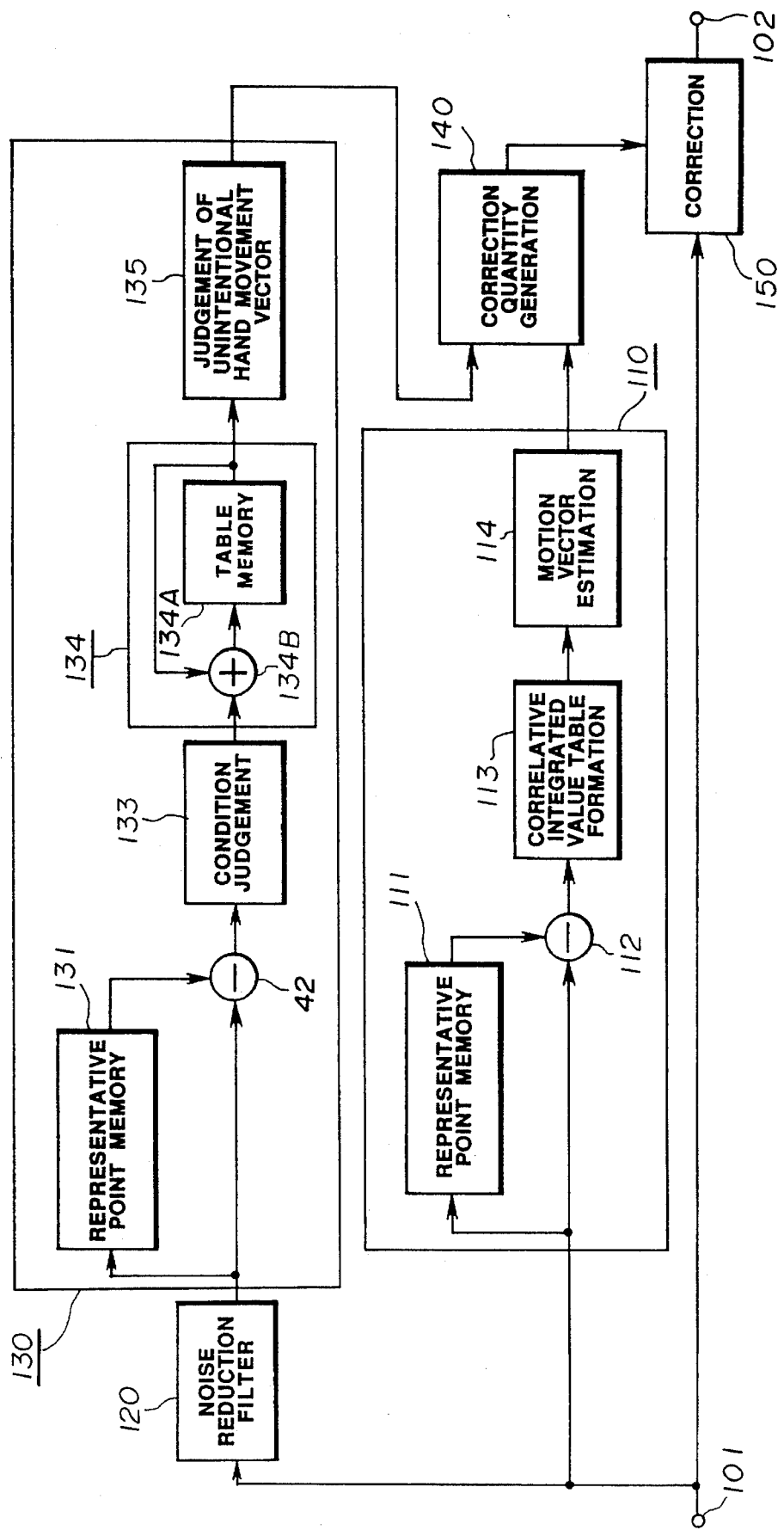
FIG. 11 is a block diagram showing another embodiment of the apparatus for judging a hand movement of an image according to this invention.

An apparatus for correcting a hand movement of an image according to this invention is constructed as shown in FIG. 11, for example.

In the apparatus for judging a hand movement of an image shown in FIG. 11, this invention is applied to a hand movement correction apparatus for correcting motion resulting from an hand movement in a video camera of the handy type. This hand movement correction apparatus comprises a unit 110 for detecting a motion vector of an image, a noise reduction filter 120, a hand movement judgment unit 130, a correction quantity generator 140, and a correction unit 150.

In FIG. 11, input video data obtained by digitizing a video signal provided as an image pickup output by an imaging unit (no shown) of the video camera is delivered to a signal input terminal 101. The input video data is delivered from the signal input terminal 101 directly to the motion vector detection unit 110 and the correction unit 150, and is delivered from the signal input terminal 1 to the hand movement judgment unit 130 through the noise reduction filter 120.

In this hand movement corrector, the motion vector detection unit 110 comprises a representative point memory 111 and a subtracter 112 which are supplied with the input video data through the signal input terminal 101, a correlative integrated value table formation circuit 113 supplied with subtraction output data by the subtracter 112, and a motion vector detector 114 supplied with correlative integrated values of the correlative integrated value table formed by the correlative integrated value table formation circuit 113.

Figure 12:
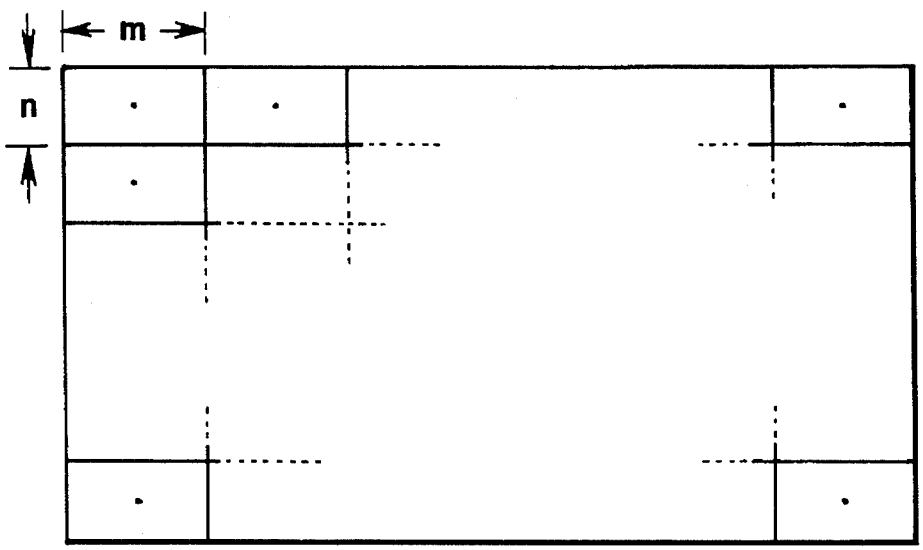
FIG. 12 is a schematic diagram showing the state where a picture is divided into blocks in a motion vector detection unit of the apparatus for judging a hand movement of an image shown in FIG. 11.
Figure 13:
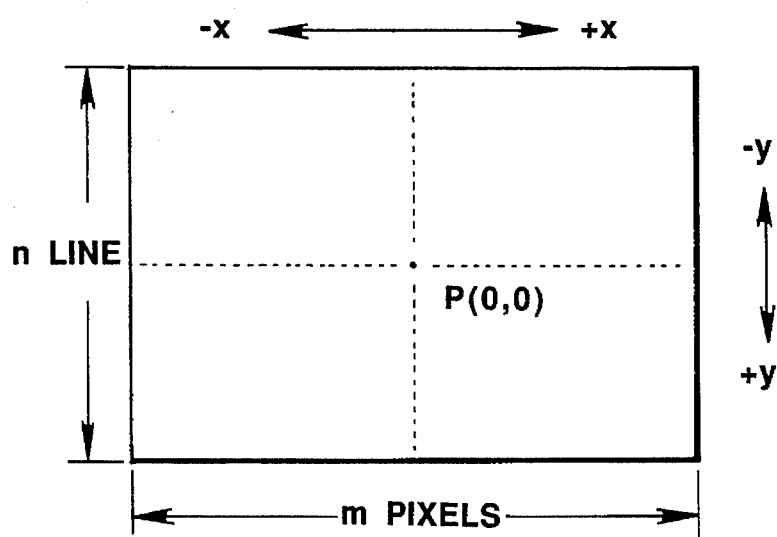
FIG. 13 is a schematic diagram showing the structure of one block of a picture divided into blocks shown in FIG. 12.

The representative point memory 111 in the motion vector detection unit 110 stores image data $I_k(0, 0)$ of representative point pixels every plural blocks obtained by dividing an image of one field comprised of input video data. In actual terms, as shown in FIG. 12, for example, a picture of one field is divided into a block of m pixels ×n lines to assume pixels at the central portion of each block to be a representative point as shown in FIG. 13 to store image data $I_k(0, 0)$ of respective representative point pixels into the representative point memory 111 for a time period of one field. It is to be noted that the above representative points are uniformly scattered or distributed on a picture. Image data $I_{k-1}(0, 0)$ of respective representative point pixels earlier by one field read out from the representative point memory 111 is delivered to the subtracter 112.

The subtracter 112 detects an absolute value $|IK_{k-1}(0, 0) - I_k(x, y)|$ of a difference between image data $I_k(x, y)$ of m×n pixels every block and image data $I_{k-1}(0, 0)$ of representative point pixels of a corresponding block of an earlier field read out from the representative point memory 111, i.e., a difference between fields with respect to input video data delivered through the signal input terminal 101, i.e., image data of a current field. The field difference absolute value obtained as subtraction output data by the subtracter 112 is delivered to the correlative integrated value table formation circuit 113.

The Correlative integrated value table formation circuit 113 integrates field difference absolute values $|I_{k-1}(0, 0) - I_k(x, y)|$ of respective blocks obtained by the subtracter 112 for a time period of one field, thus to form a correlative integrated value table having m×n integer coordinates corresponding to a pixel arrangement of one block. The correlative integrated value table formed by the correlative integrated value table formation circuit 113 indicates a distribution of an integrated values of the m×n field difference absolute values $|I_{k-1}(0, 0) - I_k(x, y)|$ of a difference between m×n fields. In this distribution, a correlative integrated value of a coordinate having the highest field correlation becomes a minimum value. Further, m×n correlative integrated values of the correlative integrated value table formed by the correlative integrated value table formation circuit 113 is delivered to the motion vector detector 114.

The motion vector detector 114 detects a coordinate of the minimum value of correlative integrated values of the correlative integrated value table formed by the correlative integrated value formation circuit 113. The correlative integrated values of the correlative integrated value table formed by the correlative integrated value table formation circuit 113 indicate interfield correlation between image data $I_{k-1}(0, 0)$ of representative point pixels of respective blocks and image data $I_k(x, y)$ of other pixels. The correlative integrated value at a coordinate corresponding to a pixel having a higher correlation takes a smaller value, and the correlative integrated value at a coordinate corresponding to the motion vector takes a minimum value. Namely, the motion vector detector 114 detects a coordinate of the minimum value of the correlative integrated values of the correlative integrated value table as a coordinate of the motion vector.

The coordinate of the minimum value of the correlative integrated value detected by the motion vector detector 114, i.e., the motion vector is delivered to the hand movement judgment unit 130 and the correction quantity generation unit 140.

In this hand movement correction apparatus, the hand movement judgment unit 130 comprises a representative point memory 131 and a subtracter 132 which are supplied with the input video data from the signal input terminal 101 through the noise reduction filter 120, a condition judgment circuit 133 supplied with subtraction output data by the subtracter 132, a frequency distribution table formation circuit 134 for forming a frequency distribution table on the basis of a judgment output by the condition judgment circuit 133, and an hand movement judgment circuit, 135 for carrying out, on the basis of the frequency distribution table formed by the frequency distribution table formation unit 134, a judgment processing as to whether or not a motion vector detected by the motion vector detection unit, 110 is a motion vector of an image resulting from an unintentional hand movement.

Figure 14:
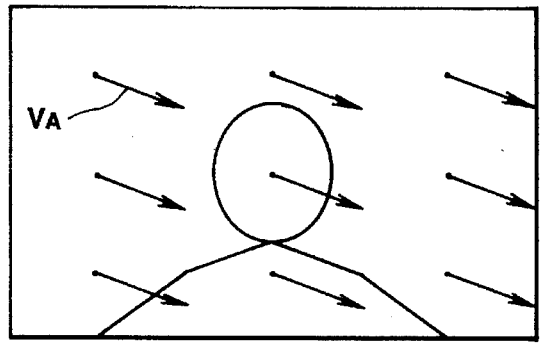
FIG. 14 is a schematic diagram showing occurrence circumstances of motion vectors resulting from a hand movement.
Figure 15:
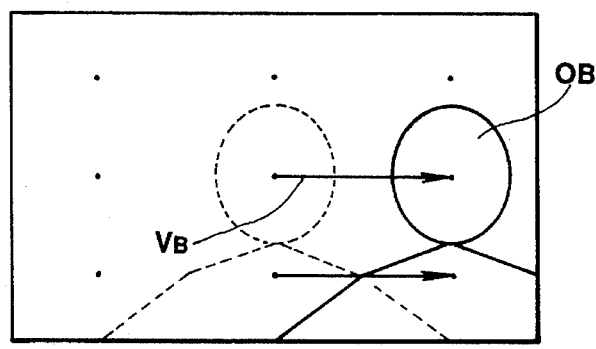
FIG. 15 is a schematic diagram showing occurrence circumstances of motion vectors resulting from a relative movement of an object.
Figure 16:
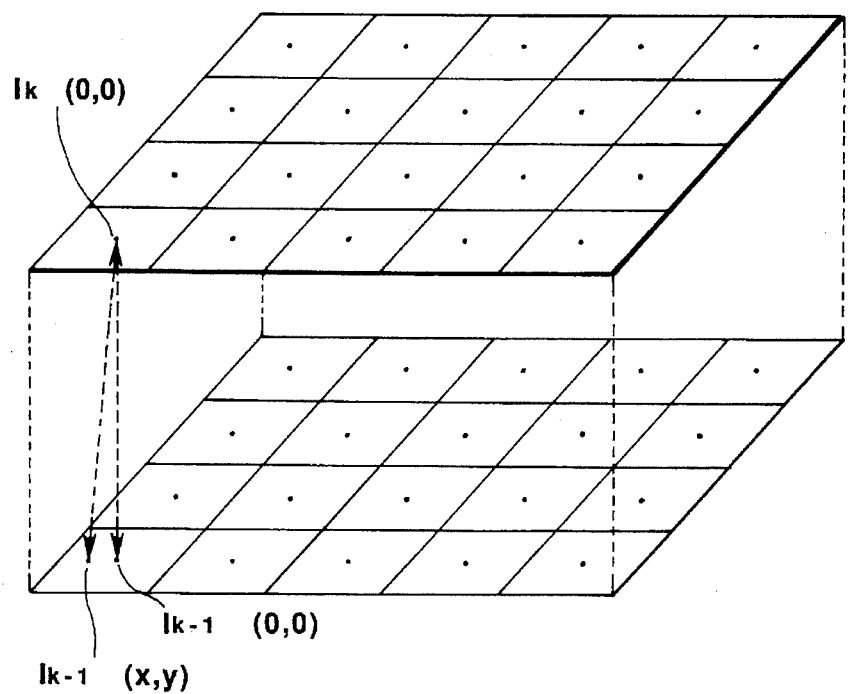
FIG. 16 is a schematic diagram used for explanation of the principle of judgment of a motion vector due to a hand movement and a motion vector due to a relative movement of an object.

In the case of an image pickup output of an image to which a motion resulting from a hand movement is given, which is obtained by a video camera of the handy type, the entirety of a picture moves because of movement of the hand. For this reason, vectors $V_A$ obtained every respective blocks are in correspondence with each other as shown in FIG. 14. On the contrary, in the case of an image pickup output of an image free from a hand movement obtained by a fixed video camera, in the case where an object OB moves from a position indicated by broken lines to a position indicated by solid line as shown in FIG. 15, a motion vector $V_B$ is generated only in a block where the moved object OB is positioned. Accordingly, an approach is employed to carry out judgment of movement by comparison between image data $I_k(0, 0)$ of respective representative point pixels and image data $I_{k-1}(0, 0)$ of an earlier field every plural blocks obtained by dividing a picture of one field as shown in FIG. 16 to detect a stationary block, thereby making it possible to discriminate between an image including the hand movement and an image free from the hand movement.

The representative point memory 131 in the hand movement judgment unit 130 stores, for a time period of one field, image data $I_k(0, 0)$ of representative point pixels every plural blocks obtained by dividing an image of one field comprised of an input video signal from which noise components are reduced or eliminated by the noise reduction filter 120. It is to be noted that the respective blocks corresponds plural blocks obtained by dividing an image of one field in the hand movement judgment unit 120. Then, image data $I_{k-1}(0, 0)$ of respective representative point pixels earlier by one field is read out from the representative point memory 131, and is then delivered to the subtracter 132.

The subtracter 132 detects an absolute value of an absolute value $|I_{k-1}(0, 0)-I_k(x, y)|$ of a difference between image data $I_k(x, y)$ of m×n pixels every block and image data $I_{k-1}(0, 0)$ of respective representative point pixels earlier by one field read out from the first representative point memory 131, i.e., an absolute value between fields with respect to input video data, i.e., image data of a current field delivered from the signal input, terminal through the noise reduction filter 120. Then, the field difference absolute value obtained as subtraction output data by the subtracter 132 is delivered to the condition judgment circuit 133.

The condition judgment circuit, 133 judges whether or not, field difference absolute values $|I_{k-1}(0, 0)-I_k(0, 0)|$ of respective blocks detected by the subtracter 132 satisfies the first judgment, condition expressed below; and $I_{k-1}(0, 0) \neq I_k(0, 0)$ the second judgment condition expressed below $|\{I_{k-1}(0, 0)-I_k(x, y)\}| \geq Th_l$ where $Th_l$ represents a threshold value for judging presence or absence of a level difference in a space.

Namely, the condition judgment circuit 133 detects a stationary block candidate including a representative point pixel having a high field correlation by the first judgment condition to carry out judgment of stationary state based on correlation of image data $I_k(x, y)$ of respective pixels with respect to image data $I_k(0, 0)$ of representative point pixels by the second judgment condition with respect to the stationary block candidate.

A judgment output by the condition judgment circuit 133 is delivered to the frequency distribution table formation circuit 134.

This frequency distribution table formation circuit 134 comprises a memory table 134A having coordinates corresponding to a pixel arrangement of one block, and an adder 134B for incrementing the frequency $f(x, y)$ of a corresponding coordinate every time a pixel satisfying the first and second judgment conditions is detected on the basis of a judgment by the condition judgment circuit 134. In the frequency distribution table formation circuit 134, a conditional frequency distribution table indicating correlation between one fields of representative point pixels is formed in the memory table 134A on the basis of an absolute value $|I_{k-1}(0, 0)-I_k(x, y)|$ of a difference between image data $I_k(x, y)$ of a current field and image data $I_{k-1}(0, 0)$ of respective representative point pixels earlier by one field. Frequency values of the frequency distribution table indicating correlation between one fields formed in the memory table 134A by the frequency distribution table formation circuit 134 are delivered to the hand movement judgment circuit 135.

The hand movement judgment circuit 135 judges a motion vector of an image detected by the motion vector detection unit 110 to result from a hand movement of image when the frequency value of a coordinate corresponding to the motion vector of an image detected by the motion vector detection unit 110 is smaller than a predetermined value with respect to the frequency table formed by the frequency distribution table formation circuit 134, and judges a motion vector of an image detected by the motion vector detection unit 110 not to result from a hand movement of an image when the above frequency value is larger than the predetermined value.

If any noise component is included in input video data delivered from the signal input terminal 101, there is the possibility that any error may take place in judgment of the stationary state with respect to respective stationary block candidates in the condition judgment circuit 133 of the hand movement judgment unit 130 by the influence of this noise component, resulting in lowered accuracy of judgment of a hand movement. In this hand movement corrector of this invention, since a noise component of input video data is reduced or eliminated, by the noise reduction filter 120 provided at the preceding stage of the hand movement judgment unit 130, hand movement judgment can be carried out with high accuracy by the hand movement judgment unit 130.

A judgment output of the hand movement judgment unit 130 is delivered to the correction quantity generation unit 140.

When a judgment output indicating that a motion vector detected by the motion vector detection unit 110 results from a hand movement of an image is delivered from the hand movement judgment unit 130 to the correction quantity generator 140, this generator 140 forms a correction signal of a correction quantity Xt expressed below:

$X_t = X_{t-1} - V_t'$ where the motion vector detected by the motion vector detection unit 110 is assumed as a hand movement vector $V_t'$ to deliver this hand movement correction signal to the correction unit 150. Further, when a judgment output indicating that a motion vector detected by the motion vector detection unit 110 does not result from a hand movement is delivered from the hand movement judgment unit 130 to the correction quantity generator 140, this generator 140 allows the hand movement vector $V_t'$ to be zero vector V[0, 0] to form a hand movement correction signal to deliver this hand movement correction signal to the correction unit 150.

Figure 17:
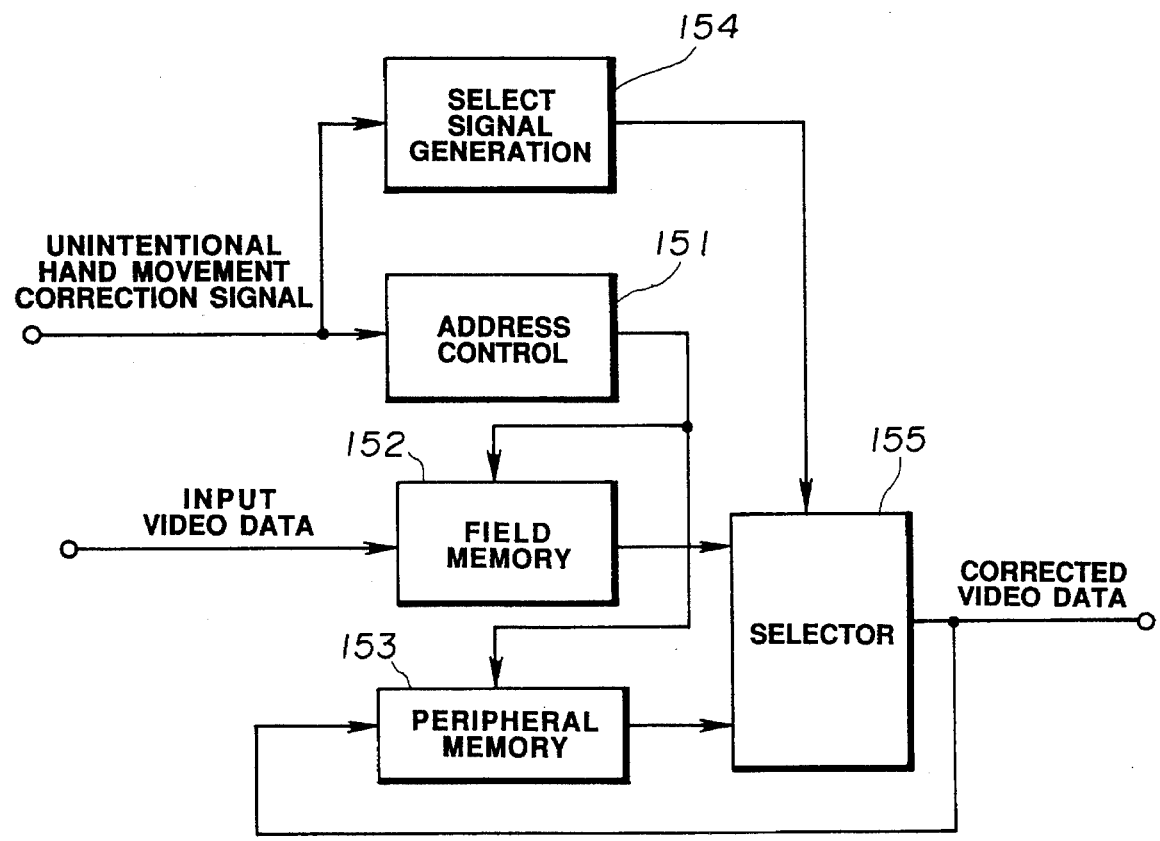
FIG. 17 is a schematic diagram showing the configuration of a correction unit in the apparatus for judging a hand movement shown in FIG. 11.

Further, the correction unit 150 comprises, as shown in FIG. 17, for example, an address control circuit 151 and a select signal generator 152 which are supplied with a hand movement signal from the correction quantity generator 140, a field memory 152 and a peripheral memory 153 in which a write/read operation of video data is carried out in accordance with an address signal delivered from the address control circuit 151, and a selector 155 for selectively outputting video data read out from the field memory 152 and the peripheral memory 153 in accordance with a select signal delivered from the select signal generator 154.

Input video data delivered through the signal input terminal 101 are sequentially written into the field memory 152. The readout address of the field memory 142 is controlled in dependency upon the hand movement vector by the hand movement correction signal. Thus, video data in which input video data of one field is moved by the hand movement vector is provided from the field memory 152. Video data read out from the field memory 152 and peripheral video data read out from the peripheral memory 153 are synthesized by selection by the selector 155. The data thus synthesized is outputted from a signal output terminal 102 as video data which has undergone hand movement processing.

Video data of the peripheral portion corresponding to a correction range of an image by the video data which has undergone hand movement correction processing outputted through the selector 155 are sequentially written into the peripheral memory 153.

In this hand movement corrector, since hand movement judgment, as to whether or not a motion vector of an image detected by the motion vector detection unit 110 results from a hand movement can be securely carried out by the hand movement judgment unit 130 as described above, hand movement correction can be securely carried out, so a natural image output is provided.

As is clear from the foregoing description, in the apparatus for correcting a hand movement of an image according to this invention, image data of representative point pixels every plural blocks obtained by dividing an image of one field comprised of an input video signal are used to detect motion vectors of that image by block matching by using the motion vector detection unit, and to judge by the hand movement judgment unit whether or not the motion vector results from a hand movement on the basis of interfield correlation of image data of representative point pixels every plural blocks obtained by dividing an image of one field comprised of an input video signal from which any noise component is reduced of eliminated by the noise reduction filter to form a hand movement correction signal of a correction quantity corresponding to the motion vector resulting from hand movement by using the correction quantity generation unit, thereby making it possible to securely implement a hand movement correction processing to the input video signal by using the correction unit.

As stated above, in the apparatus for correcting a hand movement of an image according to this invention, since whether or not a motion vector of an image results from a hand movement is securely judged to carry out an hand movement correction, high performance hand movement correct, ion in a video camera of the video type, or the like can be carried out.

We claim:

1. An apparatus for determining whether movement of an operator's hand has caused movement of an input video image which may be represented by motion vectors and for correcting the same, said apparatus comprising:

input means including an input terminal for providing image data of a plurality of video frames representing said input video image, said image data of each of said video frames being divided into a plurality of blocks of said image data each of said blocks having a plurality of pixels having respective coordinates corresponding thereto;

a memory for respectively storing values $I_k(0, 0)$ of said image data representative of point pixels for each of said plurality of blocks for one frame;

means including a subtracting circuit for determining absolute values $|\{I_{k-1}(0, 0)-I_k(x, y)\}|$ or differences between image date $I_k(x, y)$ having respective x and y coordinates associated therewith of respective pixels of blocks of a current frame and image data $I_{k-1}(0, 0)$ representative of point pixels of blocks of an earlier frame read out from said memory;

hand judgment means for judging whether the frame difference absolute values $|\{I_{k-1}(0, 0)-I_k(0, 0)\}|$ of respective blocks determined by the determining means satisfy a first judgment condition expressed as $|I_{k-1}(0, 0)-I_k(0, 0)|\neq 0$ and a second judgment condition expressed as $|\{I_{k-1}(0, 0)-I_k(x, y)\}|\geq Th_1$, where $Th_1$ is a predetermined threshold value;

frequency distribution table formation means for forming a frequency distribution table by incrementing a frequency $f(x, y)$ of the coordinates corresponding to a pixel arrangement of one block every time a pixel satisfying the first and second judgment conditions is detected by said hand judgment means;

means for calculating from said frequency distribution table formed by said frequency distribution table formation means the number of coordinates having a frequency value greater than a predetermined number of coordinates in the vicinity of a coordinate designated by a motion vector of an image and for determining that said motion vector results form said movement of said operator's hand when the calculated number of coordinates is smaller than a predetermined value; and means for forming a hand movement correction signal having a correction quantity corresponding to said motion vector which has been determined to result from said movement of said operator's hand and for receiving said image data from said input means which represents said input video image and for correcting said movement of said input video image caused by said movement of said operator's hand in accordance with said hand movement correction signal.

2. An apparatus for determining whether movement of an operator's hand has caused movement of an input video image which may be represented by motion vectors and for correcting the same, said apparatus comprising:

input means including an input terminal for providing image data of a plurality of video frames representing said input video image, said image data of each of said video frames being divided into a plurality of blocks of said image data each of said blocks having a plurality of pixels having respective coordinates corresponding thereto;

a memory for respectively storing values $I_k(0, 0)$ of said image data representative of point pixels for each of said plurality of blocks for one frame;

means including a subtracting circuit for determining absolute values $|\{I_{k-1}(0, 0)-I_k(x, y)\}|$ of differences between image data $I_k(x, y)$ having respective x and y coordinates associated therewith of respective pixels of blocks of a current frame and image data $I_{k-1}(0, 0)$ representative of point pixels of blocks of an earlier frame read out from said memory;

hand judgment means for judging whether the frame difference absolute values $|\{I_{k-1}(0, 0)-I_k(0, 0)\}|$ of respective blocks determined by the determining means satisfy a first judgment condition expressed as $|I_{k-1}(0, 0)-I_k(0, 0)|\neq 1$ and a second judgment condition expressed as $|\{I_{k-1}(0, 0)-I_k(x, y)\}|\geq Th_1$, where $Th_1$ is a predetermined threshold value;

frequency distribution table formation means for forming a frequency distribution table by incrementing a frequency $f(x, y)$ of the coordinates corresponding to a pixel arrangement of one block every time a pixel satisfying the first and second judgment conditions is detected by said hand judgment means;

means for calculating from said frequency distribution table formed by said frequency distribution table formation means an average value of frequency values of a plurality of coordinates in the vicinity of a coordinate designated by a motion vector of an image and for determining that said motion vector results from said movement of said operator's hand when said average value is smaller than a predetermined value; and means for forming a hand movement correction signal having a correction quantity corresponding to said motion vector which has been determined to result from said movement of said operator's hand and for receiving said image data from said input means which represents said input video image and for correcting said movement of said input video image caused by said movement of said operator's hand in accordance with said hand movement correction signal.

3. An apparatus for correcting movement of an image represented by an input video signal caused by movement of an operator's hand, said apparatus comprising:

input means for receiving said input video signal divided into a plurality of blocks of image data each having a plurality of pixels for each of a plurality of video fields;

a motion vector detection unit coupled to said input means and having a first memory for receiving said input video signal and for respectively storing therein, for each of said fields and for a time period corresponding to one field, image data $I_k(0, 0)$ representative of point pixels for each of the respective plurality of blocks, said motion vector detection unit further having means for determining motion vectors of an image on the basis of absolute values $|I_{k-1}(0, 0)-I_k(x, y)|$ of differences between image data $I_k(x, y)$ of respective pixels of blocks of a current field of said input video signal and image data $I_{k-1}(0, 0)$ representative of point pixels of blocks of an earlier field read out from said first memory;

a noise reduction filter coupled to said input means for reducing noise components of said input video signal and for supplying therefrom a noise reduced video signal divided into said plurality of blocks of image data each having a plurality of pixels having respective coordinates corresponding thereto for each of said plurality of video fields;

a hand movement judgment unit having a second memory for receiving said noise reduced video signal and for respectively storing therein, for each of said fields of said noise reduced video signal and for said time period corresponding to one field, image data $I_k(0, 0)$ representative of point pixels for each of the respective plurality of blocks; means for determining whether absolute values $|I_{k-1}(0, 0)-I_k(x, y)|$ of differences between image data $I_k(x, y)$ of respective pixels of blocks of a current field of said noise reduced video signal and image data $I_{k-1}(0, 0)$ representative of point pixels of blocks of an earlier field read out from said second memory satisfy a first judgment condition expressed as $I_{k-1}(0, 0) \neq I_k(0, 0)$ and a second judgment condition expressed as $|\{I_{k-1}(0, 0) \geq I_k(x, y)\}| \geq TH_l$ , where $TH_l$ is a predetermined threshold value; means for forming a frequency distribution table by incrementing a frequency value (x, y) of the coordinates corresponding to a pixel arrangement every time a pixel satisfying said first and second conditions is detected; and means for determining in accordance with said frequency distribution table that a motion vector detected by said motion vector detection unit which corresponds to a respective coordinate results from said movement of said operator's hand when the frequency value of the respective coordinate designated by said motion vector is smaller than a predetermined frequency value;

a correction quantity generation unit for forming a hand movement correction signal having a correction quantity corresponding to said motion vector which has been determined to result from said movement of said operator's hand by said hand movement judgment unit; and a correction unit for correcting said movement of said image of said input video signal caused by said movement of said operator's hand in accordance with said hand movement correction signal supplied from said correction quantity generation unit.

* * * * *